(12) United States Patent
Young

(10) Patent No.: US 6,883,042 B1
(45) Date of Patent: Apr. 19, 2005

(54) METHOD AND STRUCTURE FOR AUTOMATIC SCSI COMMAND DELIVERY USING THE PACKETIZED SCSI PROTOCOL

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 318 days.

(21) Appl. No.: 09/842,750

(22) Filed: Apr. 25, 2001

(51) Int. Cl.[7] ............................................. G06F 13/00
(52) U.S. Cl. ........................ 710/30; 710/4; 710/36; 710/107; 710/313
(58) Field of Search ..................... 710/4, 36, 57, 710/107, 313

(56) References Cited

U.S. PATENT DOCUMENTS

| | | | | |
|---|---|---|---|---|
| 6,065,087 A | * | 5/2000 | Keaveny et al. | 710/315 |
| 6,161,155 A | * | 12/2000 | Simms et al. | 710/57 |
| 6,400,730 B1 | * | 6/2002 | Latif et al. | 370/466 |
| 6,477,165 B1 | * | 11/2002 | Kosco | 370/389 |

* cited by examiner

Primary Examiner—Jeffrey Gaffin
Assistant Examiner—Mohammad Farooq
(74) Attorney, Agent, or Firm—Gunnison, McKay & Hodgson, L.L.P.; Forrest Gunnison

(57) ABSTRACT

A SCSI initiator system includes a Packetized SCSI Protocol hardware packet engine that automatically transmits Packetized SCSI protocol command blocks to a SCSI target with substantially zero latency between the transmission of adjacent command blocks. The packet engine operates independently of any other hardware circuits in the SCSI initiator that are capable of command management. The SCSI initiator system includes a target execution queue containing at least one hardware I/O control block for a SCSI target. The target execution queue is stored in a memory. The system also includes a Packetized SCSI Protocol hardware packet engine coupled to the target execution queue. The Packetized SCSI Protocol hardware packet engine generates Packetized SCSI Protocol packets using information in the at least one hardware I/O control block directly.

11 Claims, 7 Drawing Sheets

| Bit<br>Byte | 7 | 6 | 5 | 4 | 3 | 2 | 1 | 0 |
|---|---|---|---|---|---|---|---|---|
| 0 | TYPE |||||||| 
| 1 | RESERVED ||||||||
| 2 | MSB | TAG |||||||
| 3 | colspan="7" | LSB |||||||
| 4 | MSB | colspan="7" |||||||
| 5 | colspan="8" ||||||||
| 6 | colspan="8" ||||||||
| 7 | LOGICAL UNIT NUMBER ||||||||
| 8 | colspan="8" ||||||||
| 9 | colspan="8" ||||||||
| 10 | colspan="8" ||||||||
| 11 | colspan="7" | LSB |||||||
| 12 | RESERVED ||||||||
| 13 | MSB | colspan="7" |||||||
| 14 | DATA LENGTH ||||||||
| 15 | colspan="7" | LSB |||||||
| 16 | RESERVED ||||||||
| 17 | RESERVED ||||||||
| 18 | MSB | IUCRC INTERVAL |||||||
| 19 | colspan="7" | LSB |||||||
| 20 | MSB | colspan="7" |||||||
| 21 | IUCRC ||||||||
| 22 | colspan="8" ||||||||
| 23 | colspan="7" | LSB |||||||

Fig. 1A
(Prior Art)

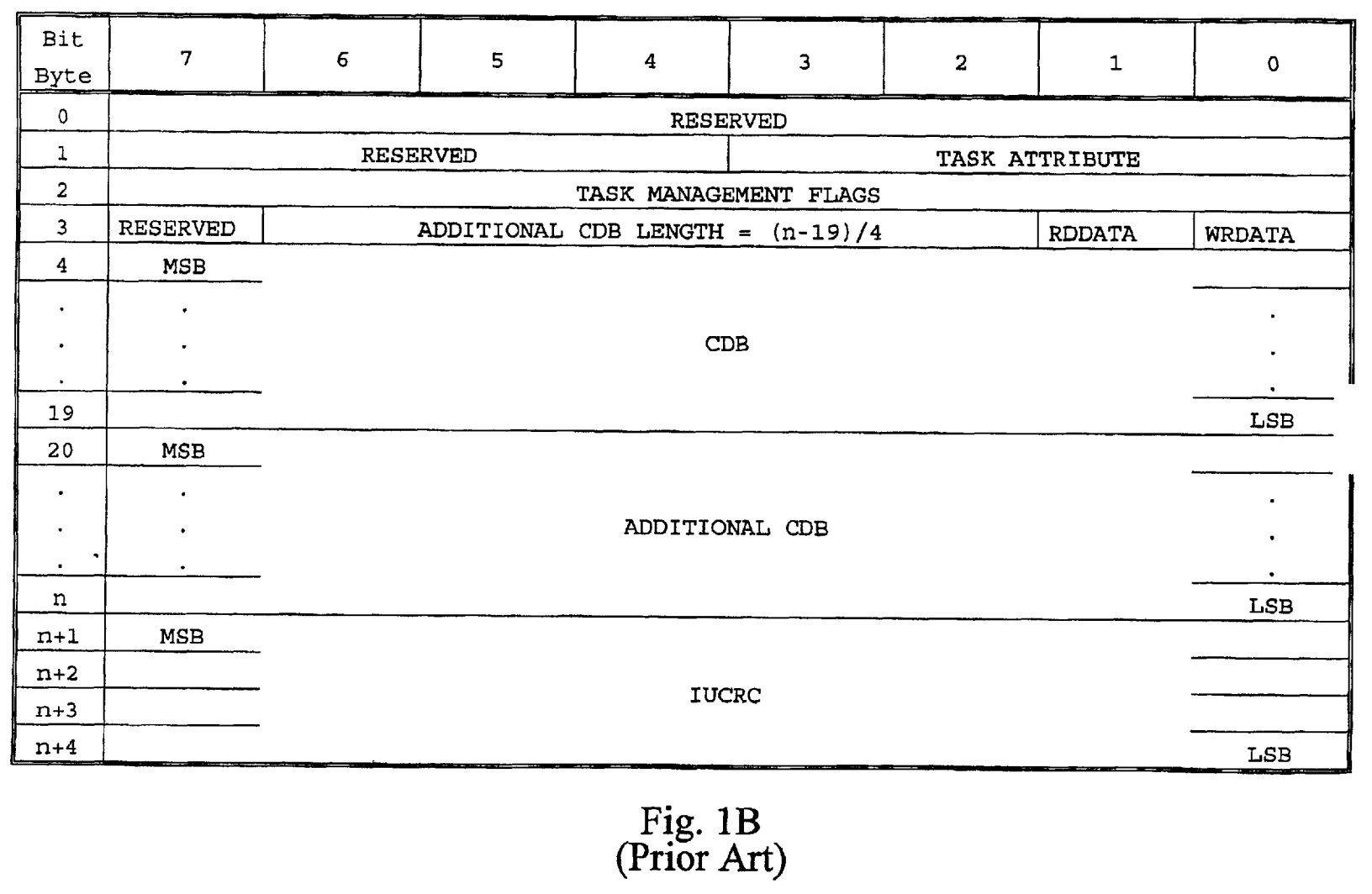

| Bit Byte | 7 | 6 | 5 | 4 | 3 | 2 | 1 | 0 |
|---|---|---|---|---|---|---|---|---|
| 0 | RESERVED | | | | | | | |
| 1 | RESERVED | | | | | TASK ATTRIBUTE | | |
| 2 | TASK MANAGEMENT FLAGS | | | | | | | |
| 3 | RESERVED | | | ADDITIONAL CDB LENGTH = (n-19)/4 | | | RDDATA | WRDATA |
| 4 | MSB | | | | | | | |
| . . . | | | CDB | | | | | |
| 19 | | | | | | | | LSB |
| 20 | MSB | | | | | | | |
| . . . | | | ADDITIONAL CDB | | | | | |
| n | | | | | | | | LSB |
| n+1 | MSB | | | | | | | |
| n+2 | | | IUCRC | | | | | |
| n+3 | | | | | | | | |
| n+4 | | | | | | | | LSB |

Fig. 1B
(Prior Art)

METHOD AND STRUCTURE FOR AUTOMATIC SCSI COMMAND DELIVERY USING THE PACKETIZED SCSI PROTOCOL

BACKGROUND OF THE INVENTION

1. Field of the Invention

The present invention relates generally to data transfers over an I/O bus, and more particularly, to Packetized SCSI Protocol command transfers over a SCSI bus.

2. Description of Related Art

Prior to the Packetized SCSI Protocol, the SCSI Protocol utilized the well-known SCSI bus phases, Message Out, Message In, Command, Data Out, Data In, and Status to exchange information and data between a SCSI initiator and a SCSI target over a SCSI bus. Only one command block (CDB) was transferred for each connection of a SCSI initiator to a SCSI target.

Typically, for a SCSI host adapter as the SCSI initiator, the SCSI host adapter waited for the SCSI bus to become free, arbitrated for the bus, and then selected a target. Usually, the SCSI host adapter sent three messages to the target and then changed the SCSI bus phase to phase Command. A sequencer on the host adapter moved a CDB from a sequencer control block (SCB) that was received from a host to a DMA channel that in turn transferred the CDB over the SCSI bus to the SCSI target.

After the SCSI target received the CDB, the SCSI target disconnected from the SCSI bus by changing the bus phase to phase Message In, and then sending one or two messages to the SCSI host adapter. After sending the messages, the SCSI target actually disconnected from the SCSI bus.

For the SCSI host adapter to send another CDB to this target, this complete sequence was repeated. The time between the SCSI target receiving the end of the first CDB and the beginning of the second CDB, as mandated by the SCSI specification, was a few microseconds, which was a significant amount of time compared with the total time required to execute the CDB. In addition, the time required by the sequencer to move each byte of the CDB from the SCB to the DMA channel was about 50 nanoseconds.

Another protocol, the Packetized SCSI Protocol, has been developed for executing information and data transfers over the SCSI bus. The formal definition of the Packetized SCSI Protocol is specified in "Information Technology—SCSI Parallel Interface(SPI-3)," Revision 13a, American National Standards Institute, New York, N.Y. (Jan. 12, 2000), which is incorporated herein by reference in its entirety as a demonstration of the knowledge of one of skill in the art. The Packetized SCSI Protocol enables a SCSI initiator to transfer multiple successive CDBs without the SCSI target having to disconnect from the SCSI bus between CDBs.

With the Packetized SCSI Protocol, information that was previously conveyed between the SCSI initiator and the SCSI target during bus phases Message, Command, and Status is now conveyed via packets, called information units, during data phases. Specifically, to capitalize on the higher data throughput during the SCSI data phases, the Packetized SCSI Protocol specifies that all information exchanged between a SCSI initiator and a SCSI target is done via information units (IU), in either phase Data In or phase Data Out phases exclusively. Each CDB is conveyed to a target via two packets.

FIG. 1A is an illustration of a definition of a byte data stream for a SPI L_Q information unit that is used in the Packetized SCSI protocol as the first of the two packets in a command block. This information unit definition was taken from the SCSI Parallel Interface (SPI-3) referenced above. Thus, the data in the twenty-four bytes is defined therein and so is known to those of skill in the art.

FIG. 1B is an illustration of a definition of a byte data stream for a SPI command information unit that follows the SPI L_Q information unit of FIG. 1A in the data stream and is the second of the two packets used to convey a CDB. This information unit definition also was taken from the SCSI Parallel Interface (SPI-3) referenced above. Thus, data in this packet is defined therein and so is known to those of skill in the art.

While the data streams for the information units of FIGS. 1A and 1B are known, the problem remains to get this data onto the SCSI bus so that the advantages of the Packetized SCSI protocol can be realized. For example, with the prior art SCSI host adapter, fifty nanoseconds were required to move each byte of the SCB to the DMA channel by the sequencer. This latency prevented realization of the full capability of the SCSI bus with the Packetized SCSI Protocol.

SUMMARY OF THE INVENTION

According to one embodiment of the present invention, a SCSI initiator system includes a Packetized SCSI Protocol hardware packet engine, sometimes called a packet engine, that automatically generates Packetized SCSI protocol command blocks, sometimes called command blocks, for transfer to a SCSI target with substantially zero latency between generation of the command blocks. The packet engine operates independently of any other hardware circuits in the SCSI initiator that are capable of command management.

With the Packetized SCSI Protocol hardware packet engine, the data in the information units is used directly from where the data is stored. Consequently, the prior art latency associated with moving the data to enable transmission to the SCSI bus also has been eliminated.

The Packetized SCSI protocol hardware packet engine transmits a first command block to the SCSI bus followed by a second command block with substantially zero latency. The latency between command blocks has been reduced by over an order of magnitude with respect to the prior art and so is no longer a limiting factor. Consequently, the latency between adjacent command blocks is said to be substantially zero.

Thus, the Packetized SCSI Protocol hardware packet engine eliminates the need to move data from a hardware I/O control block to a DMA channel, and eliminates the latency between transmitting command blocks (CDBs) to a target. With the Packetized SCSI Protocol hardware packet engine, the time delay bottlenecks associated with prior art SCSI initiators have been eliminated. Consequently, the capacity of a SCSI bus is now the limiting performance factor with respect to transfers of CDBs from a SCSI initiator to a SCSI target using the Packetized SCSI Protocol.

In one embodiment, the SCSI initiator system includes a target execution queue containing at least two hardware I/O control blocks for a SCSI target. The target execution queue is stored in a memory. The system also includes a Packetized SCSI Protocol hardware packet engine that is coupled to the target execution queue. As indicated above, the Packetized SCSI Protocol hardware packet engine transmits a Packetized SCSI Protocol command block command for each hardware I/O control block in the target execution queue with substantially zero latency between transmission of adjacent Packetized SCSI Protocol command blocks.

The Packetized SCSI protocol hardware packet engine also includes a hardware information unit transfer controller having a start input line and a data out phase input line. The hardware information unit transfer controller sequences hardware generation of the Packetized SCSI Protocol command blocks upon receiving an active signal on both the input lines.

A hardware header generator is coupled to the hardware information unit transfer controller. The hardware header generator generates fields in a command L_Q information unit in response to signals from the hardware information unit transfer controller.

A hardware body generator also is coupled to the hardware information unit transfer controller. The hardware header body generator generates fields in a command information unit in response to signals from the hardware information unit transfer controller.

A method for generating a Packetized SCSI Protocol command block includes:

transferring information required in a command information unit and available in a hardware I/O control block directly from the hardware I/O control block; and transferring information required in the command information unit but unavailable in the hardware I/O control block directly from a register.

BRIEF DESCRIPTION OF THE DRAWINGS

FIG. 1A is a prior art illustration that defines the byte stream for a command L_Q information unit for a Packetized SCSI protocol command block.

FIG. 1B is a prior art illustration that defines the byte stream for a command information unit for the Packetized SCSI protocol command block.

In the drawings and the following detailed description, elements with the same reference numeral are the same element. Also, the first digit of a reference numeral for an element indicates the first drawing in which that element appeared.

DETAILED DESCRIPTION

Figure 2:
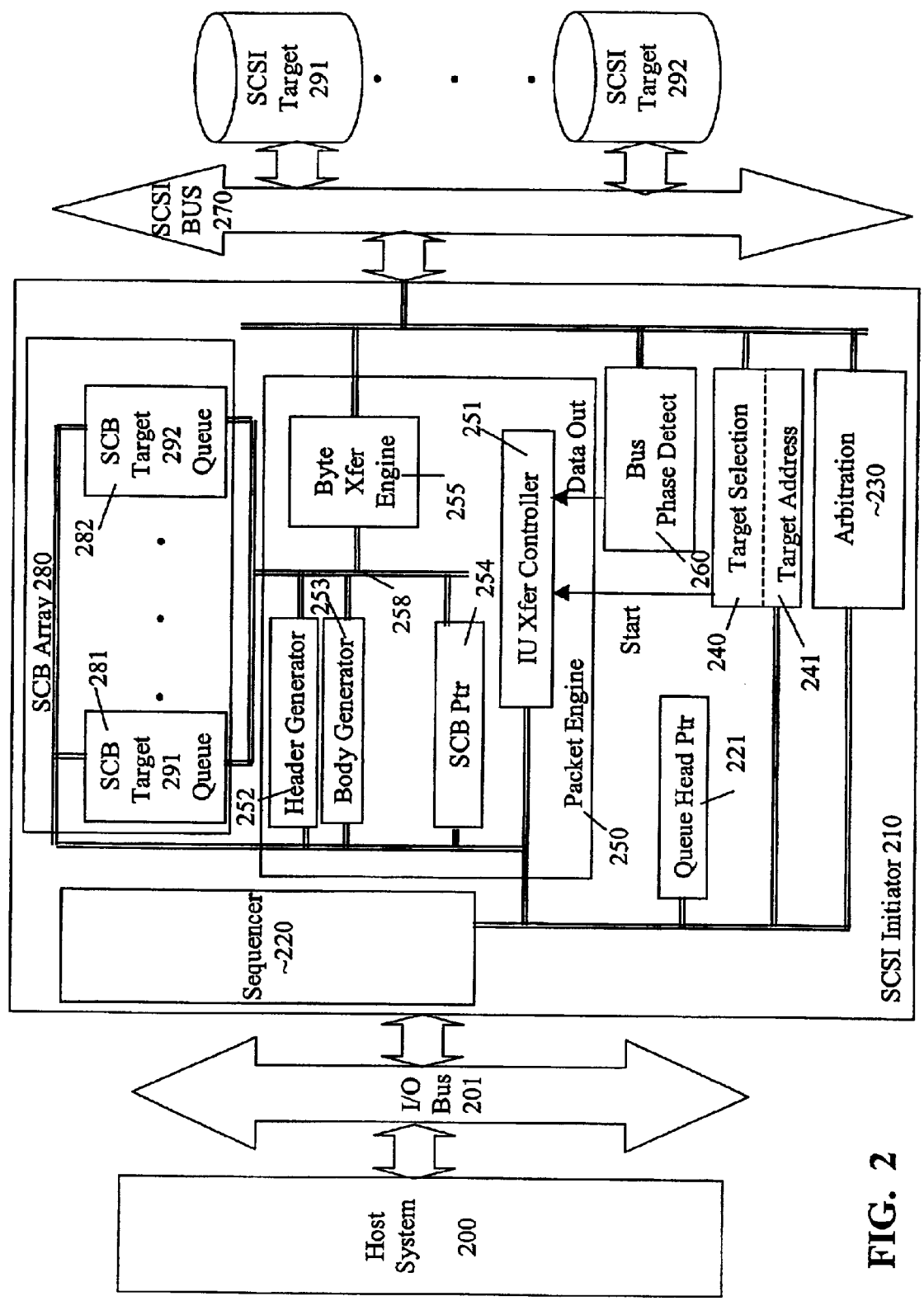
FIG. 2 is a high-level block diagram of a SCSI initiator that includes a Packetized SCSI protocol hardware packet engine according to one embodiment of the present invention.

According to one embodiment of the present invention, a SCSI initiator 210 includes a Packetized SCSI Protocol hardware packet engine 250, sometimes called packet engine 250 that automatically generates Packetized SCSI Protocol information units for transfer of a Packetized SCSI Protocol command block to a SCSI target, e.g., any one of SCSI targets 291 to 292. The Packetized SCSI Protocol command block is transmitted to a SCSI bus 270 at a maximum data transfer rate sustainable by SCSI bus 270. After initialization, packet engine 250 operates independently of any other hardware circuits in SCSI initiator 210 that are capable of command management.

As explained more completely below, packet engine 250 transmits a first Packetized SCSI Protocol command block, and then transmits a second Packetized SCSI protocol command block with a substantially zero latency following transmission of the first Packetized SCSI Protocol command block. In general, packet engine 250 transmits a plurality of Packetized SCSI Protocol command blocks to a target with substantially zero latency between the transmission of each of the Packetized SCSI Protocol command blocks.

Hence, packet engine 250 and the method of this embodiment of the present invention reduce the latency between transmitting Packetized SCSI Protocol command blocks (CDBs) to SCSI bus 270 to substantially zero. The latency is typically in a range from about 10 nanoseconds to 100 nanoseconds and in one embodiment is about 20 nanoseconds. In contrast, the prior art typically required from about three to about ten microseconds between transmission of adjacent Packetized SCSI protocol command blocks. Packet engine 250 reduces the latency between transmission of adjacent command blocks for a target by over an order of magnitude, and to the point that the latency is effectively zero between transmission of adjacent Packetized SCSI Protocol command blocks.

Packetized SCSI Protocol hardware packet engine 250 also eliminates the need for a processor or other on-chip hardware to move data from a sequencer control block (SCB), i.e., from a hardware I/O control block storage location, to a DMA channel prior to transmission to SCSI bus 270. Specifically, it is no longer necessary to move information from its storage location to another location for transmission to SCSI bus 270. The information is transmitted to SCSI bus 270 directly from its storage location. For example, information is transmitted directly from a stored hardware I/O control block. Therefore, packet engine 250 eliminates the prior art latency associated with movement of information to enable transmission of the information to SCSI bus 270.

In addition, in one embodiment, each stored hardware I/O control block includes a pointer to a storage location of the next hardware I/O control block that in turn includes a command for the SCSI target. Consequently, no latency is introduced in searching for the next hardware I/O control block for the target.

With Packetized SCSI Protocol hardware packet engine 250, the time delay bottlenecks associated with prior art SCSI initiators have been eliminated. Consequently, the capacity of SCSI bus 270 is the limiting performance factor with respect to transfers of CDBs from a SCSI initiator to a SCSI target using the Packetized SCSI Protocol.

In one embodiment, SCSI initiator 210 is a SCSI host adapter integrated circuit 210. Engine 250 is incorporated as a module within SCSI host adapter integrated circuit 210, and operates independently of sequencer 220 following initialization, in one embodiment. In FIG. 2, only the components necessary to describe this invention are illustrated to avoid detracting from the invention. As those of skill in the art will appreciate, SCSI host adapter integrated circuit 210 contains modules in addition to those illustrated in FIG. 2.

As explained more completely below, an information unit transfer controller 251 in combination with header generator 252 automatically generates a correct command L_Q information unit that is transmitted over SCSI bus 270 to the target device. Rather than copy data from a sequencer control block (SCB) stored in SCB array 280 to a DMA engine as in the prior-art, information unit transfer controller 251 provides the appropriate information directly from a current SCB and registers in header generator 252 to SCSI bus 270 via byte transfer engine 255, in this embodiment. Herein, a SCB is an example of a hardware I/O control block.

The information bytes in the byte stream for the command L_Q information unit are taken directly from the contents of a group of registers in header generator 252 and from data in the current SCB. Information unit transfer controller 251 accesses these registers and SCB data in a prescribed sequence as defined by a send command L_Q IU operation 350 (FIG. 3) to direct the information making up the command L_Q information unit directly to SCSI bus 270. In one embodiment, a state machine in controller 251 performs command L_Q IU operation 350.

As explained more completely below, controller 251 either uses the contents of a register directly or uses the contents of a register as a pointer to another storage location that contains the needed information. In each case, the information is accessed directly and is not moved from one location to another once packet engine 250 starts operation 350. Header generator 252 is used to generate some sequence bytes, e.g., using the contents a register in deciding the value of the byte in the byte steam making up the command L_Q information unit.

Figure 5:
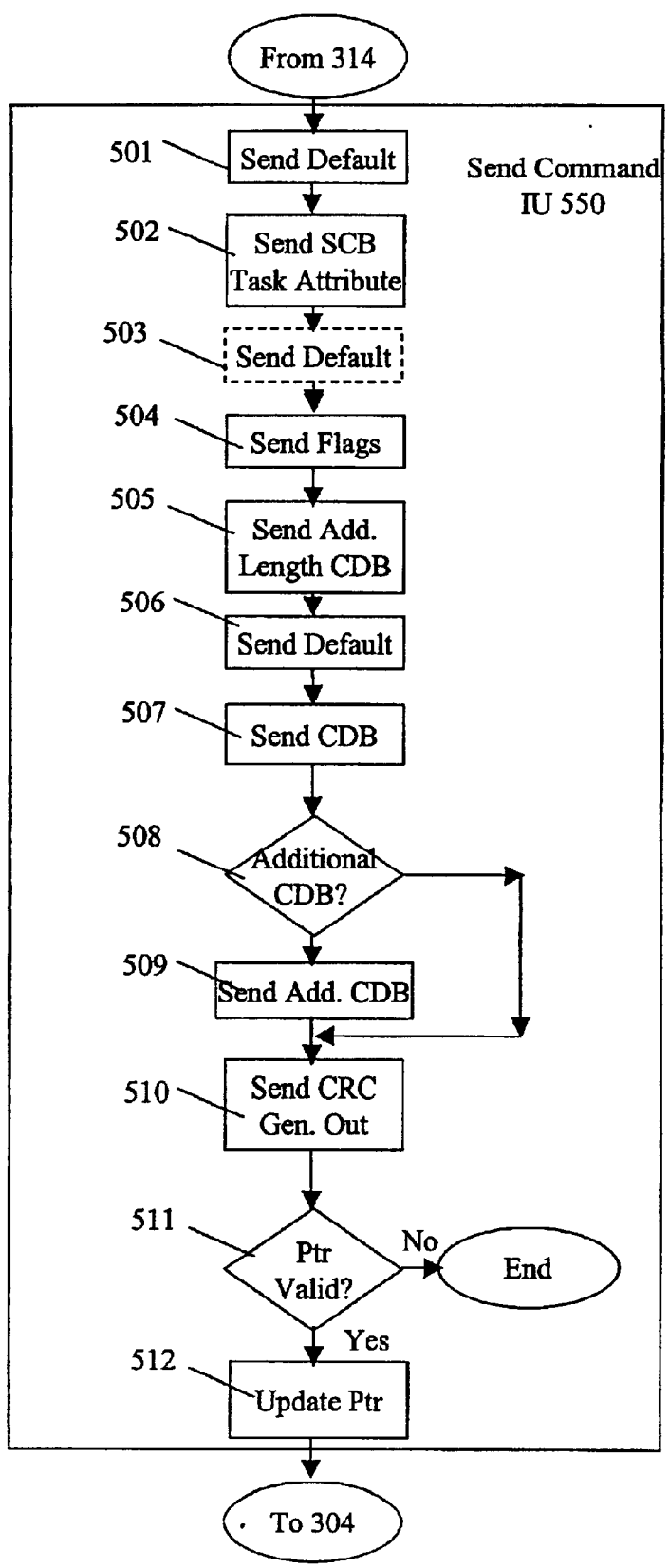
FIG. 5 is a process flow diagram for automatically sending a command information unit that is implemented by a state machine in an information unit transfer controller of the Packetized SCSI protocol hardware packet engine according to one embodiment of the present invention.

Immediately, after transfer of the command L_Q information unit, information unit transfer controller 251 and body generator 253 automatically generate a command information unit via send command IU operation 550 (FIG. 5). Information unit transfer controller 251 and body generator 253 use appropriate information directly from the current SCB and registers in body generator 253. Again, engine 250 operates independently of sequencer 220, and so the latencies associated with the operation of sequencer 220 do not limit the transfer of the command information unit.

If the current SCB contains a pointer to another SCB, information unit transfer controller 251 automatically transmits another command L_Q information unit and another command information unit with substantially zero latency. The pointer is loaded into a register, and the process is repeated. No time is spent searching for the next SCB. This process continues so long as there are additional SCBs for the target in the target SCB execution queue and the target continues to accept additional command packets.

Hence, sequencer 220 is not required to build the two packets for a CDB and then burst the packets. Moreover, there is not a latency associated with waiting for sequencer 220 to build another packet pair when multiple CDBs are transmitted in succession, or associated with waiting for sequencer 220 to reinitialize various hardware circuits.

In one embodiment of the present invention, SCBs received by initiator 210 from host system 200 are put into target execution queues, e.g., queue 281 to queue 282 in SCB array 280. Each SCSI target has its own execution queue and so SCB array 280 includes an execution queue for each target on SCSI bus 270 for which SCBs are pending execution.

In this embodiment, each execution queue is a linked list of SCBs. Each target execution queue has a head pointer and a tail pointer. The head pointer points to the first SCB in the target execution queue, and the tail pointer points to the last SCB in the target execution queue. Each SCB contains a next SCB pointer that points to the next SCB in the target execution queue. The last SCB in the target execution queue has an invalid next SCB pointer, signifying that there are no more SCBs in that target execution queue. One embodiment of a SCB execution queue that can be used with the present invention is described in commonly assigned U.S. patent application Ser. No. 09/587,538, entitled Two-Dimensional Execution Queue for Host Adapters" of B. Arlen Young filed on Jun. 1, 2000, now U.S. Pat. No. 6,609,161 issued on Aug. 19, 2003, which is incorporated herein by reference in its entirety.

Figure 3:
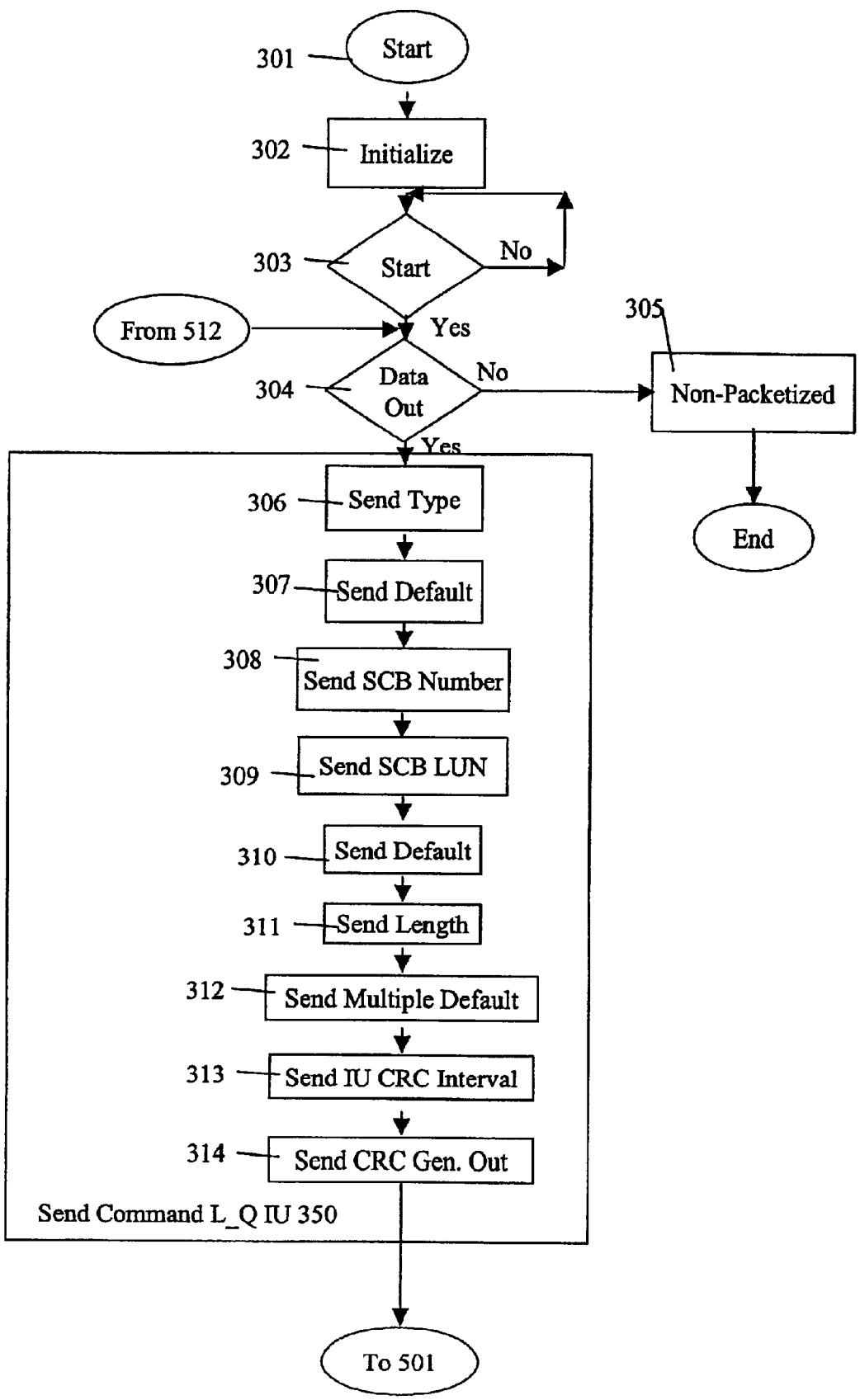
FIG. 3 is a process flow diagram for automatically sending a command L_Q information unit that is implemented by a state machine in an information unit transfer controller of the Packetized SCSI protocol hardware packet engine according to one embodiment of the present invention.

To start transfer of a command to a target, sequencer 220 determines whether there is a SCB in SCB array 280 awaiting execution. If there is such a SCB, sequencer 220 loads the target specified in the SCB in a target address register 241 in target selection hardware module 240, and copies the target execution queue head pointer for the target execution queue containing the SCB from queue head pointer register 221 into SCB pointer register 254 in packet engine 250 in initialization operation 302 (FIG. 3).

Figure 4:
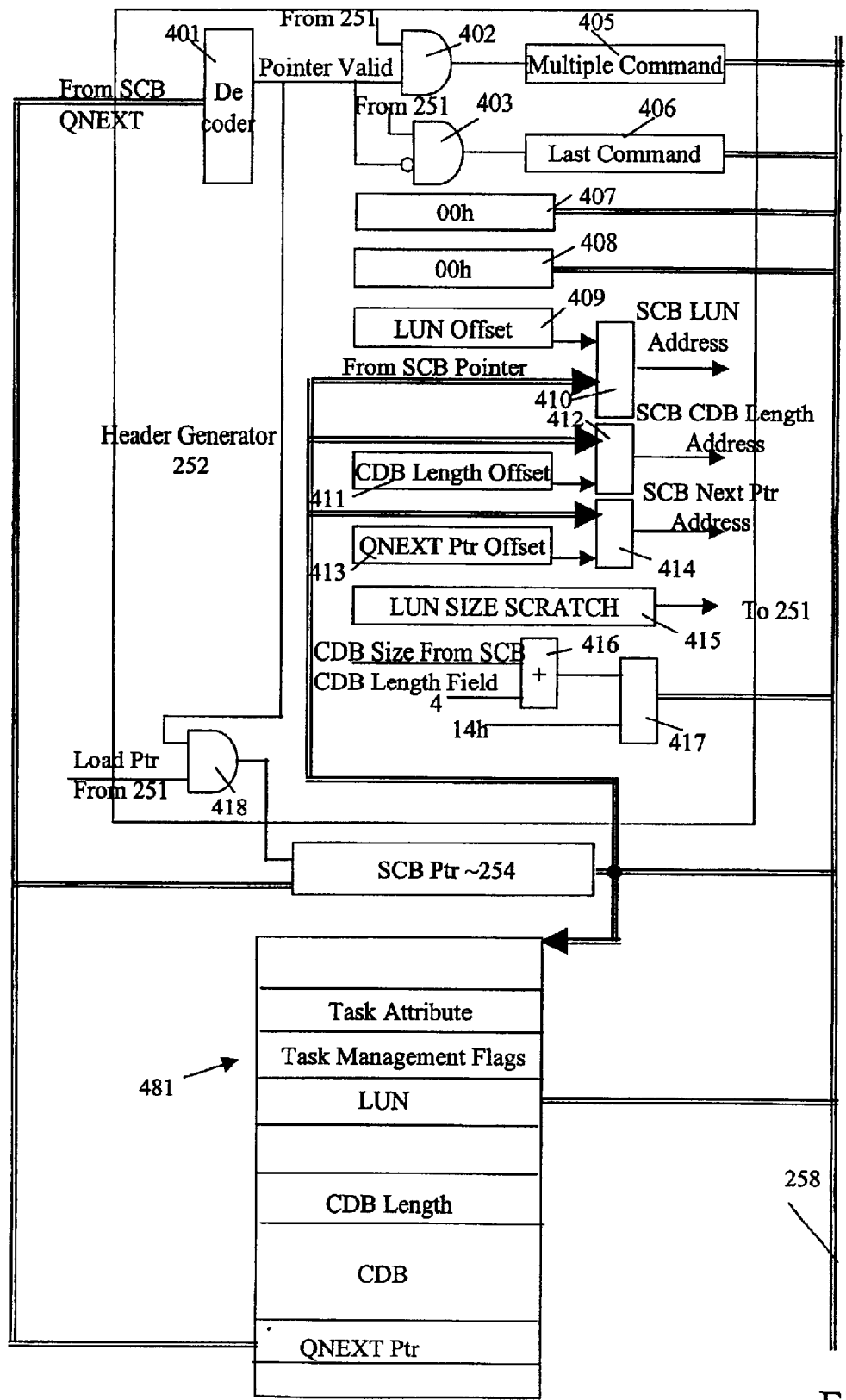
FIG. 4 is a more detailed diagram of a hardware header generator in the Packetized SCSI protocol hardware packet engine according to one embodiment of the present invention.

In this embodiment, as described more completely below, data in a SCB is used directly in the transmission of the packets making up a command block by packet engine 250. SCB 481 (FIG. 4) is the SCB in SCB array 280 that is addressed by the value in SCB pointer register 254. The information and the location of each piece of information within SCB 481 are known, because a driver on host system 200 constructs SCB 481. In FIG. 4, only the information in SCB 481 utilized by this embodiment of packet engine 250 is illustrated. The SCB storage locations presented in FIG. 4 are for convenience only and should not be interpreted to limit the invention to the particular SCB configuration shown. In view of this disclosure, those of skill in the art can implement the invention for any hardware I/O control block of interest.

If SCSI initiator 210 processes a single SCB format, the values in registers LUN offset 409, CDB length offset 411 and QNEXT pointer offset 413 are hardwired in packet engine 250. In another embodiment, offset registers 409, 411, and 413 are registers that are loaded by sequencer 220 in initialization operation 302. Note that initialization operation 302 is done only once and not for each SCB in the target execution queue. Each of these offsets is the distance from location of the SCB as specified by the value in the SCB pointer 254 to the start of the specified information. In this embodiment, the value in SCB pointer 254 is the number of the storage location in SCB array 280 and is the SCB identification number. LUN size scratch register 415 is also initialized. Typically, this is set to one byte. Finally, registers 407 and 408 are set to 00h.

Also, as explained below, registers in body generator 253 are also initialized in initialization operation 302. After initializing the necessary registers in packet engine 250, i.e., initializing packet engine 250, sequencer 220 enables automatic hardware arbitration circuit 230 and automatic target selection circuit 240.

Initialization operation 302 transfers to start check operation 303 in information unit transfer controller 251. In one embodiment, information unit transfer controller 251 is a hardware state machine that controls operations 303 to 314 (FIG. 3) and operations 501 to 512 (FIG. 5), as described more completely below.

Automatic hardware arbitration circuit 230 automatically arbitrates for SCSI bus 270. When the arbitration is won, automatic target selection hardware circuit 240 selects the target specified by the target address. Both hardware circuits 230 and 240 are known to those of skill in the art. For example, the circuits in Adaptec host adapter Model No. AIC-7899 are suitable for use in this invention. Upon successful target selection, target selection hardware circuit 240 generates an active signal on line START to information unit transfer controller 251.

In response to the active signal on line START, packet engine 250 is automatically started, and check operation 303 transfers to data out phase check operation 304. A bus phase detect circuit 260 decodes the SCSI bus phase and provides the bus phase to controller 251. Circuit 260 is found in prior art host adapter integrated circuits and so is not considered further. If the SCSI bus phase is data out, i.e., the signal on line DATA OUT goes active, data out check operation 304 transfers to send command L_Q IU operation 350 and otherwise to non-packetized transfer operation 305.

If the SCSI bus phase is not phase DATA OUT, packet engine 250 assumes that the selected target in operating in other than a Packetized SCSI protocol mode. Therefore, sequencer 220 is notified that the selection is complete and the mode is non-Packetized SCSI. In this case, sequencer 220 completes the SCB execution using the prior art methods. After notifying sequencer 220 in operation 305, operation 305 returns to end operation, and packet engine 250 remains inactive until sequencer 220 again configures packet engine 250 for another SCB.

However, if the SCSI bus phase is DATA OUT, send type operation 306 in send command L_Q IU operation 350 is started. As indicated in FIG. 1A, the first byte of data transferred in the command L_Q information is a type byte. In this embodiment, the type byte transmitted can have two values. Multiple command register 405 contains a value of 02h and last command register 406 has a value of 01h. When the type byte indicates a multiple command, there is at least one more SCB in the SCB execution queue for the selected target. When the type byte indicates a last command, the current SCB is the last SCB in the SCB execution queue.

In the embodiment of FIG. 4, the value loaded in SCB pointer register 254 is a first input to a SCB next pointer address generator 414. A second input to address generator 414 is the value in QNEXT pointer offset register 413. The address from address generator 414 accesses a QNEXT pointer field in current SCB 481. Current SCB 481 is addressed by the value in SCB pointer register 254. The value in QNEXT pointer field is driven on a bus to decoder 401.

In this embodiment, if there is another SCB in the SCB execution queue for the selected target, there is a valid pointer to the next SCB in the target execution queue in QNEXT pointer field of current SCB 481 and otherwise there is an invalid SCB pointer in QNEXT pointer field. If the field contains a valid pointer, decoder 401 generates an active signal on pointer valid line to a second input terminal of AND gate 402 and to an inverter on a second input terminal of AND gate 403.

Hence, when information unit transfer controller 251 drives an active single on a first input line to AND gate 402 and to a first input line to AND gate 403 in send type operation 306, one of multiple command register 405 and last command register 406 is enabled to drive a value onto bus 258 to byte transfer engine 255, which is the type byte in the command L_Q information unit. Operation send type 306 in controller 251 transfers processing to send default operation 307.

As is known to those of skill in the art, byte transfer engine 255 can be implemented in various ways. In one embodiment, engine 255 is a DMA engine, and in another embodiment is appropriate multiplexers and/or bus line drivers used in conjunction with the various storage locations so that the various bytes are driven directly onto SCSI bus 270. In either case, information unit transfer controller 251 provides the necessary control signals to the components used so that the stored information is transferred directly from the storage location in the required sequence and without being moved to another location to facilitate transfer.

In send default operation 307, byte one in the command L_Q information unit, which is a reserved byte is transmitted by engine 250. Specifically, information unit transfer controller 251 enables register 407 and so a value of ooh is driven onto bus 258 and directly transmitted onto SCSI bus 270 as byte one in the command L_Q information unit. (Herein, a byte followed by a number, e.g., byte one, refers to the number in the left hand column of FIG. 1A or FIG. 1B. At a particular point in the information unit, the number of bytes transferred is the byte number plus one, as is apparent to those of skilled in the art.) Default operation 307 transfers to send SCB number operation 308.

In this embodiment, the value contained in SCB pointer register 254 identifies the storage location of the SCB in SCB array 280. Bytes two and three of the command L_Q information unit are a tag. In this embodiment, the SCB storage location in SCB array 280 as specified in register 254 is transmitted as the tag. Thus, in send SCB number operation 308, information unit transfer controller 251 enables the storage location of SCB pointer 254 and so the SCB number is driven onto bus 258 and directly transmitted onto SCSI bus 270 as bytes two and three in the tag field of the command L_Q information unit. Send SCB number operation 308 transfers processing to send SCB LUN operation 309.

In send SCB LUN operation 309, information unit transfer controller 251 reads the number stored in LUN size scratch register 415 and enables that number of zero value bytes to be directly transmitted. In this embodiment, registers 407 and 408 are sequentially enabled and the values therein directly transmitted. Upon the number of zero bytes in LUN size scratch register 415 being transmitted, controller 251 enables the logical unit number (LUN) field in SCB 481 so that the value in that field completes the logical unit number byte stream in the command L_Q information unit. Send SCB LUN operation 309 transfers to send default operation 310.

In send default operation 310, byte twelve in the command L_Q information unit, which is a reserved byte is transmitted by engine 250. Specifically, information unit transfer controller 251 enables register 407 and so a value of 00h is driven onto bus 258 and directly transmitted onto SCSI bus 270 as byte twelve in the command L_Q information unit. Default operation 310 transfers to send length operation 311.

Bytes 13 to 15 of the command L_Q information unit are the Data Length field and contain the length, in bytes, of the following Command information unit, not including the cyclic redundancy code (CRC). In this embodiment, the CDB size, which is the value in the CDB length field of SCB 481, is a first input to an adder 416, and four is a second input to adder 416. The output of adder 416 is the CDB size plus four and is a first input to comparator 417. A second input to comparator 417 is the value 14h. When information unit transfer controller 251 enables the output of comparator 417 in send length operation 311, the greater of 14h and the CDB size specified in SCB 481 plus four is driven onto bus 258 and then directly onto SCSI bus 270. Send length operation 311 transfers to send multiple default operation 312.

Bytes 16 and 17 of the command L_Q information unit are reserved bytes. In send multiple default operation 312, bytes 16 and 17 in the command L_Q information unit are transmitted by engine 250. Specifically, information unit transfer controller 251 enables register 407 and so a value of 00h is driven onto bus 258 and directly transmitted onto SCSI bus 270 as byte sixteen in the command L_Q information unit. Information unit transfer controller 251 then enables register 408 and so a value of 00h is driven onto bus 258 and directly transmitted onto SCSI bus 270 as byte seventeen in the command L_Q information unit. Multiple default operation 312 transfers to send IU CRC interval operation 313.

Bytes eighteen and nineteen in the command L_Q information unit are the IUCRC interval field. The value in this field specifies the span, in bytes, of the CRC calculation. The value equals the number of information unit bytes between each CRC field in the packets. In this embodiment, the value in this field is set to zero, and is ignored by the target. Hence, in send IU CRC interval operation 313, information unit transfer controller 251 enables register 407 and so a value of 00h is driven onto bus 258 and directly transmitted onto SCSI bus 270 as byte eighteen in the command L_Q information unit. Information unit transfer controller 251 then enables register 408 and so a value of 00h is driven onto bus 258 and directly transmitted onto SCSI bus 270 as byte nineteen in the command L_Q information unit. Note that in another embodiment, operation 312 could be merged with operation 313 so that operation 312 sends four consecutive zero bytes. Send IU CRC interval operation 313 transfers to send CRC generator output operation 314.

As each byte of command L_Q information unit is transferred to SCSI bus 270, a CRC generator processes the byte. This process is the same as that used in the prior art host adapters and so is known to those of skill in the art. In operation 314, information unit transfer controller 251 enables the output of the CRC generator to be driven onto bus 258 as bytes twenty to twenty-three of the command L_Q information unit. Upon completion of operation 314, processing transfers to send command information unit operation 550.

Figure 6:
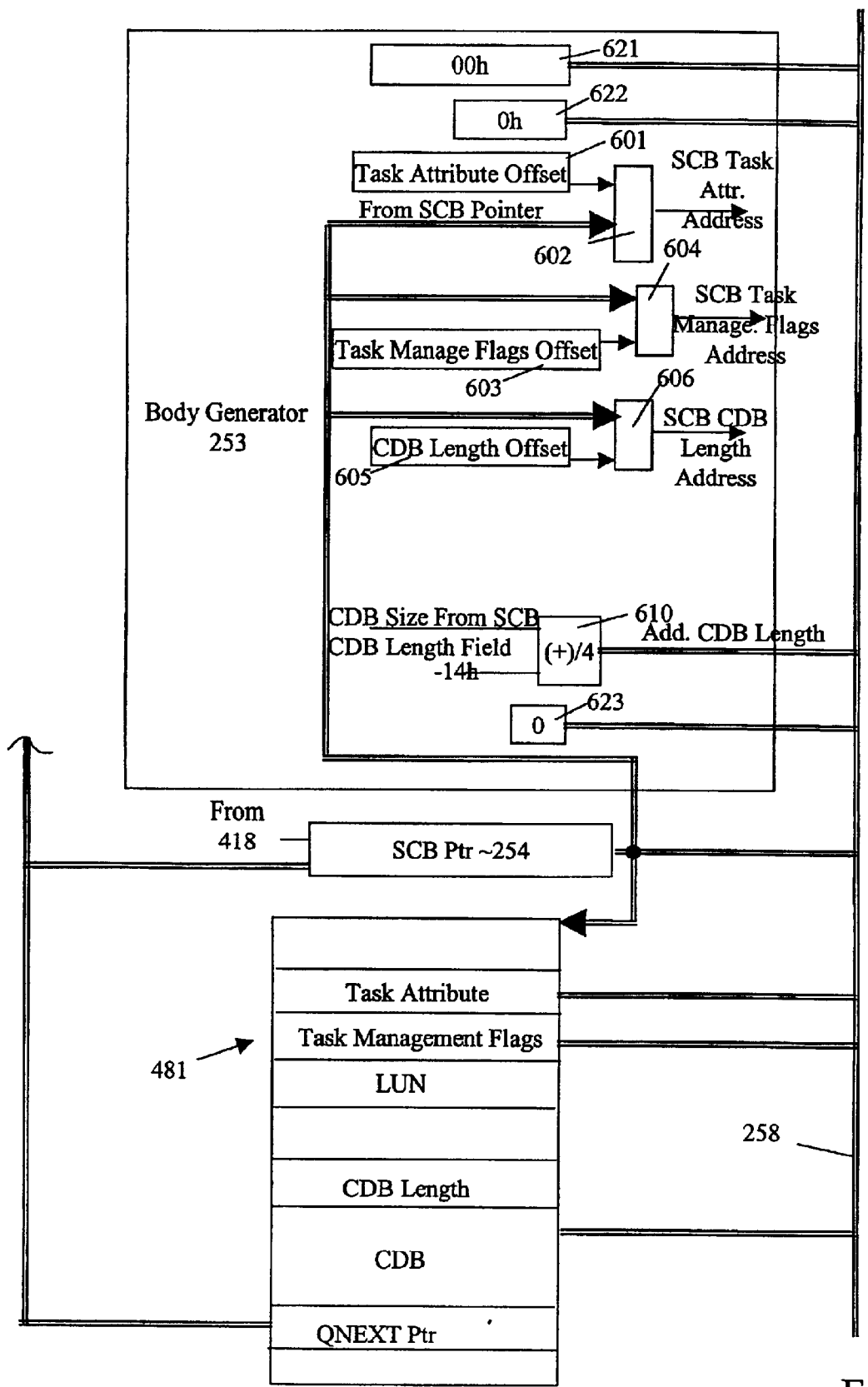
FIG. 6 is a more detailed diagram of a hardware body generator in the Packetized SCSI protocol hardware packet engine according to one embodiment of the present invention.

FIG. 5 is one embodiment of a process flow diagram for send command information unit process 550 that packet engine 250 uses to automatically transmit a command information unit, and FIG. 6 is a more detailed diagram of one embodiment of body generator 253 that is used in process 550. In this embodiment, a state machine in controller 251 implements process 550.

As indicted above, in initialization operation 302, registers in body generator 253 are initialized. If a single SCB format is processed by SCSI initiator 210, values in registers task attribute offset 601, task management flags offset 603, and CDB length offset 605 are hardwired in body generator 253. In another embodiment, offset registers 601, 603, and 605 are registers that are loaded by sequencer 220 in initialization operation 302. Each of the offsets in these registers is the distance from the location of the SCB, as specified by the value in the SCB pointer 254 to the start of the specified information.

Register 621 is one byte in size and is set to zero. Register 622 is four bits in size and is set to zero. Register 623 is one bit is size and is set to zero. Registers 621 to 623 are illustrative only and are not intended to limit this invention to this specific embodiment. A zero bit, four zero bits, and a zero byte can all be generated using a single byte size register, which could be for example register 407. An important aspect is to provide appropriate registers so latency is not introduced waiting for a register to become available.

In send default operation 501, byte zero in the command information unit, which is a reserved byte is transmitted by engine 250. (Again, byte zero is the first byte transferred since the byte number starts with zero as illustrated in FIG. 1B.) Specifically, information unit transfer controller 251 enables register 621 and so a value of 00h is driven onto bus 258 and directly transmitted onto SCSI bus 270 as byte zero in the command information unit. Default operation 501 transfers to send SCB task attribute operation 502.

In send SCB task attribute operation 502, task attributes from SCB 481 are driven onto bus 258 as the four least significant bits of byte one of the command information unit by information unit transfer controller 251. Those of skill in the art will appreciate that this combination of operations is illustrative only and is not intended to limit the invention to this specific sequence. For example, if the task attribute field in SCB 481 is less than a byte in size an optional send default operation 503 is used to pad the remainder of the byte with zeros. Upon completion of send default operation 503, controller 251 transfers processing to send flags operation 504.

In this embodiment, the combination of send flags operation 504, send additional CDB length operation 505, and send default operation 506 drive byte three of the command information unit on bus 258. While these operations are described herein sequentially, in one embodiment, the operations effectively occur in parallel so that byte three is driven on bus 258 as a whole.

In particular in send flags operation 504, controller 251 enables register 622 so that the two least significant bits are driven onto the two least significant bits of bus 258. The read data and write data flags are set to zero, because these flags are ignored in the Packetized SCSI Protocol. Operation 504 transfers to operation 505.

In operation 505, controller 251 enables the output of unit 610 to be driven onto bits two to six of bus 258 as the next five bits in byte three of the command information unit. In the embodiment of FIG. 6, the CDB size from the CDB length field of SCB 481 that is addressed by the output from register 606 is a first input to unit 610. A second input into unit 610 is a minus sixteen. Typically, CDB sizes are sixteen bytes or less. For CDB sizes greater than sixteen bytes, the additional CDB length field contains the length in four-byte words of the additional CDB field in the command information unit. Consequently, unit 610 combines the two input signals and if the result is zero or less, drives a zero on each of the output bits to bus 258. If the result is greater than zero, the result is divided by four and the quotient is driven on the five output bits. Operation 505 transfers processing to operation 506.

Finally, controller 251 enables register 623 so that the zero value bit is driven onto bus 258 as the most significant bit of byte three of the command information unit. This bit is reserved and so in this embodiment is set to zero. Operation 506 transfers processing to send CDB operation 507.

In send CDB operation 507, controller 251 enables register 608 so that the CDB in SCB 481 is addressed and driven onto bus 258. Controller 251 enables each byte in turn in the CDB field of SCB 481 until the number of bytes indicated by the CDB length field in SCB 481 has been transferred. If the CDB length field indicates that the CDB is less than sixteen bytes in length, controller 251 enables register 621 and sends bytes having a zero value as the least significant bytes until sixteen bytes have been transferred in operation 507. Operation 507 transfers processing to additional CDB check operation 508.

In operation 508, controller 251 determines whether the output from unit 610 is greater than zero. If the output from unit 610 is greater than zero, check operation 508 transfers to send additional CDB operation 509 and otherwise to send CRC generator out operation 510.

In send additional CDB operation 509, controller 251 retrieves the additional CDB bytes from host memory and passes the bytes to bus 258 in one embodiment. In another embodiment, the bytes are prefetched by controller 251 and stored in a local memory while the command L_Q information unit is being transmitted, and so are transferred from the local memory in operation 509. In either case, the number of additional four byte blocks is supplied in operation 509. Operation 509 transfers processing to operation 510.

As each byte of the command information unit is transferred to SCSI bus 270, a CRC generator processes the byte. This process is the same as that used in the prior art host adapters and so is known to those of skill in the art. In operation 510, information unit transfer controller 251 enables the output of the CRC generator to be driven onto bus 258 as bytes n to (n+4) of the command information unit. Upon completion of operation 510 processing transfers to pointer valid check operation 511.

In pointer valid check operation 511, controller 251 determines whether the value in field QNEXT pointer of SCB 481 is valid, e.g., is the signal on the pointer valid line (FIG. 4) active. If the pointer value is valid, there are additional SCBs in the SCB execution queue for the target, and otherwise the current SCB is the last SCB in the SCB execution queue. Thus, if the pointer value is valid, check operation 511 transfers to update pointer operation 512 and otherwise to end operation that terminates processing by packet engine 250 and notifies sequencer 220 that the target execution queue is empty.

Update pointer operation 512 copies the pointer from field QNEXT pointer in SCB 481 to SCB pointer register 254 so that the next SCB in the SCB execution queue becomes the current SCB and transfers processing to operation 304. In this embodiment, operation 512 drives an active signal on load pointer line to AND gate 418 and if there is a valid pointer in QNEXT pointer field of SCB 481, as described above, there also is an active signal on the pointer valid line to AND gate 418. Hence, AND gate 418 generates an active signal on a load terminal of SCB pointer register 254 that results in the pointer in QNEXT pointer field being loaded into register 254.

Packet 250 engine continues to cycle between operations 350 and 550 and as long as the SCSI bus phase remains phase Data Out, i.e., as long as the signal on input line DATA OUT remains active, until the end of the target execution queue is reached. If the SCSI bus phase changes from phase Data Out during a command information unit transfer or before a command information unit transfer, packet engine 250 sets an appropriate status bit and interrupts sequencer 220. If the SCSI bus phase changes after a command information unit transfer, packet engine 250 notifies sequencer 220 that packet engine 250 has stopped.

When sequencer 220 receives the notice from packet engine 250, sequencer 220 reads a next SCB pointer register. If this register holds an invalid pointer, sequencer 220 changes queue head pointer register 221 to indicate that the SCB execution for the target is empty. If there is a valid pointer in the next SCB pointer register, the target has indicated that the target cannot handle additional CDBs at this time. Hence, sequencer 220 updates header pointer register 221 if necessary, and attempts to select the target again at a later time.

The hardware circuit embodiments are illustrative only, and are not intended to limit the invention to the particular configuration illustrated. For example, circuits 252 and 253 can be combined into a single circuit. Similarly, processes 350 and 550 can be implemented with a single state machine. Hence, in view of this disclosure, those of skill in the art can implement packet engine 250 in a wide variety of configurations and in a wide variety of SCSI initiators.

I claim:

1. A method for transmitting Packetized SCSI Protocol command blocks comprising:

transmitting a first Packetized SCSI Protocol command block comprising:

transmitting at least one byte in said first Packetized SCSI Protocol command block directly from a storage location of said at least one byte wherein said storage location of said at leant one byte is within a stored first hardware I/O control block; and transmitting a second Packetized SCSI Protocol command block with a substantially zero latency following transmission of said first Packetized SCSI Protocol command block wherein said stored first hardware I/O control block includes a pointer to a storage location of a second hardware I/O control block, and further wherein said second hardware I/O control block includes information used directly in said transmitting said second Packetized SCSI Protocol command block.

2. The method of claim 1 wherein said at least one byte is in a logical unit number field of said first Packetized SCSI protocol command block.

3. A SCSI initiator system comprising:

a target execution queue containing at least two hardware I/O control blocks for a SCSI target wherein the target execution queue is stored in a memory; and a Packetized SCSI Protocol hardware packet engine coupled to the target execution queue, wherein the Packetized SCSI Protocol hardware packet engine transmits a Packetized SCSI Protocol command block for each hardware I/O control block in said target execution queue with substantially zero latency between transmission of adjacent Packetized SCSI Protocol command blocks.

4. The SCSI initiator system of claim 3 wherein the Packetized SCSI protocol hardware packet engine further comprise:

a hardware information unit transfer controller having a start input line and a data out phase input line wherein the hardware information unit transfer controller sequences hardware generation of the Packetized SCSI Protocol command blocks upon receiving an active signal on the start input line and an active signal on the data out phase input line.

5. The SCSI initiator system of claim 4 wherein the Packetized SCSI protocol hardware packet engine further comprises:

a hardware header generator coupled to the hardware information unit transfer controller, wherein the hardware header generator generates fields in a command L_Q information unit in response to signals from the hardware information unit transfer controller.

6. The SCSI initiator system of claim 5 wherein the Packetized SCSI protocol hardware packet engine further comprises:

a hardware body generator coupled to the hardware information unit transfer controller, wherein the hardware body generator generates fields in a command information unit in response to signals from the hardware information unit transfer controller.

7. The SCSI initiator system of claim 6 further comprising a hardware I/O control block pointer register coupled to the hardware header generator.

8. The SCSI initiator system of claim 7 wherein the hardware I/O control block pointer register is also coupled to the hardware body generator.

9. The SCSI initiator system of claim 5 further comprising a hardware I/O control block pointer register coupled to the hardware header generator.

10. The SCSI initiator system of claim 4 wherein the Packetized SCSI protocol hardware packet engine further comprises:

a hardware body generator coupled to the hardware information unit transfer controller, wherein the hardware body generator generates fields in a command information unit in response to signals from the hardware information unit transfer controller.

11. The SCSI initiator system of claim 10 further comprising a hardware I/O control block pointer register coupled to the hardware body generator.

* * * * *